(12) United States Patent
Khidekel

(10) Patent No.: US 10,570,764 B2
(45) Date of Patent: Feb. 25, 2020

(54) BULB SEAL AND SPRING

(71) Applicant: ROHR, INC., Chula Vista, CA (US)

(72) Inventor: Ann Elizabeth Khidekel, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 820 days.

(21) Appl. No.: 15/089,215

(22) Filed: Apr. 1, 2016

(65) Prior Publication Data

US 2017/0284216 A1    Oct. 5, 2017

(51) Int. Cl.

| | |
|---|---|
| *F01D 11/00* | (2006.01) |
| *F16J 15/02* | (2006.01) |
| *F02K 1/80* | (2006.01) |
| *B64D 29/00* | (2006.01) |
| *F02C 7/28* | (2006.01) |
| *F02K 1/72* | (2006.01) |

(52) U.S. Cl.
CPC ............ *F01D 11/005* (2013.01); *B64D 29/00* (2013.01); *F02C 7/28* (2013.01); *F02K 1/72* (2013.01); *F02K 1/805* (2013.01); *F16J 15/027* (2013.01)

(58) Field of Classification Search
CPC ....... F01D 11/005; F01D 25/26; B64D 29/02; B64D 29/04; F16J 15/027
See application file for complete search history.

(56) References Cited

U.S. PATENT DOCUMENTS

| | | |
|---|---|---|
| 5,897,120 A | 4/1999 | Scavo et al. |
| 7,506,839 B2 | 3/2009 | Conner |
| 9,103,298 B2 | 8/2015 | Gormley |
| 2012/0308368 A1* | 12/2012 | Helvaci ................ F01D 11/00 415/175 |
| 2013/0341875 A1* | 12/2013 | LeBlanc ................ F02C 7/28 277/637 |
| 2016/0061328 A1* | 3/2016 | Ritoper ................ F16J 15/065 277/645 |

* cited by examiner

*Primary Examiner* — Woody A Lee, Jr.
*Assistant Examiner* — Michael L Sehn
(74) *Attorney, Agent, or Firm* — Snell & Wilmer L.L.P.

(57) ABSTRACT

A sealing system may include a bulb seal coupled to a first component and a spring coupled to a second component. The bulb seal may contact the spring to form a seal between the first component and the second component. The bulb seal may be relatively stiff when new and cause the spring to compress. The bulb seal may be relatively flexible as it ages, and the spring may cause the bulb seal to compress. The bulb seal and the spring may maintain a seal throughout the life of the sealing system. The sealing system may maintain a constant separation between the first component and the second component throughout the life of the sealing system.

18 Claims, 10 Drawing Sheets

BULB SEAL AND SPRING

FIELD

The present disclosure relates to an aircraft engine nacelle, and more particularly, to a seal system for an aircraft nacelle.

BACKGROUND

A nacelle for a turbofan propulsion system on a typical commercial airliner is structure which surrounds the engine providing smooth aerodynamic surfaces for airflow around and into the engine. The nacelle also helps define a bypass air duct through the propulsion system. The nacelle may also include a thrust reverser which can deploy and provide reverse thrust to help slow the aircraft after touchdown. Part of the nacelle is an aerodynamic cowl that surrounds the engine core aft of the fan, and forms the radial interior surface of the bypass air duct. It forms a generally enclosed space around the core of the engine called the core compartment. Thrust reverser halves may hinge open in order to provide access to the core compartment.

Nacelles may use bulb seals in many locations, such as between the thrust reverser halves and the portions of the pylon or nacelle contacted by the thrust reverser halves. When elastomeric bulb seals are new, the seals may be overly stiff, which may decrease the ability of the seal to compress and form a complete seal, and which may cause deformation or deflection of adjacent components. Over time, the seal may soften beyond the desired stiffness, which may also prevent the seal from forming a complete seal.

SUMMARY

An aircraft engine nacelle may comprise an outer sleeve; an inner fixed structure surrounding a portion of an engine and helping to define a core compartment, the outer sleeve and the inner fixed structure defining between them a bypass air duct, the inner fixed structure being rotatable relative to a nacelle component; a bulb seal coupled to the inner fixed structure; and a spring coupled to the nacelle component, wherein the bulb seal and the spring are configured to form a seal between the inner fixed structure and the nacelle component.

In various embodiments, the bulb seal may comprise an elastomeric material. The spring may comprise a metallic material. A first fastener may couple a first end of the spring to the nacelle component. A second fastener may couple a second end of the spring to the nacelle component. A second end of the spring may be configured to slide relative to the nacelle component. An elasticity of the bulb seal may be configured to increase over time. The spring may comprise a first stiff end, a second stiff end, a stiff central portion located between the first stiff end and the second stiff end, a first flexible portion located between the first stiff end and the stiff central portion, and a second flexible portion located between the stiff central portion and the second stiff end. The bulb seal and the spring may be configured to maintain a constant distance between the inner fixed structure and the nacelle component.

A sealing system may comprise a first component; a second component; a bulb seal coupled to the first component; and a spring coupled to the second component; wherein the bulb seal and the spring are configured to form a seal between the first component and the second component.

In various embodiments, the bulb seal and the spring may be configured to maintain a constant distance between the first component and the second component. The first component may comprise an inner fixed structure of an aircraft nacelle, and the second component may comprise a nacelle component. The bulb seal may comprise an elastomeric material. The spring may comprise a metallic material. The spring may comprise a first stiff end, a second stiff end, a stiff central portion located between the first stiff end and the second stiff end, a first flexible portion located between the first stiff end and the stiff central portion, and a second flexible portion located between the stiff central portion and the second stiff end.

A nacelle may comprise a first component; a second component; a bulb seal coupled to the first component; and a spring coupled to the second component; wherein the bulb seal and the spring are configured to form a seal between the first component and the second component.

In various embodiments, the bulb seal and the spring may be configured to maintain a constant distance between the first component and the second component. The first component may comprise an inner fixed structure of an aircraft nacelle, and the second component may comprise a nacelle component. The bulb seal may comprise an elastomeric material. The spring may comprise a metallic material.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

Figure 1:
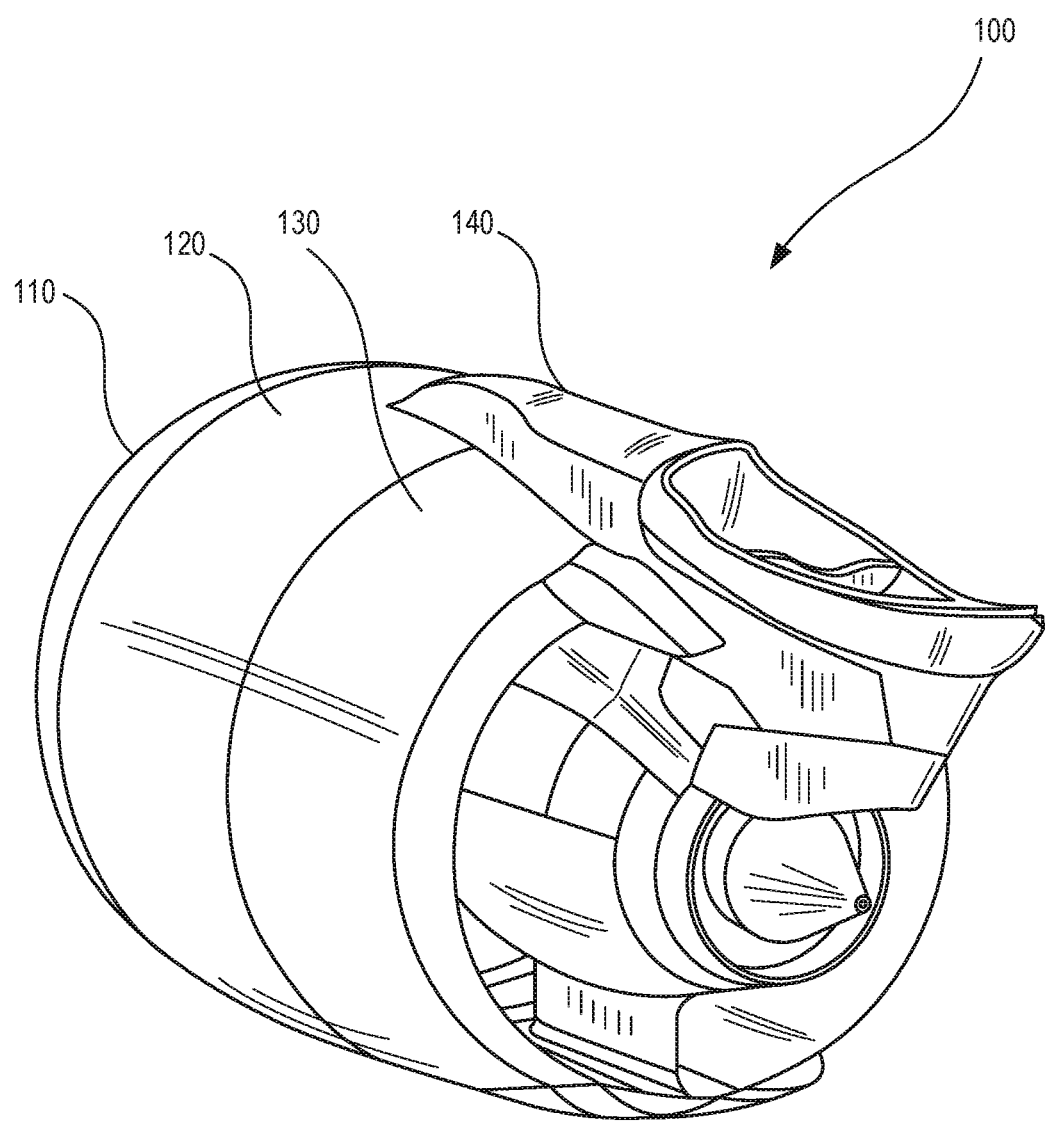
FIG. 1 illustrates a perspective view of a nacelle in accordance with various embodiments.

Referring to FIG. 1, a nacelle 100 for a gas turbine engine is illustrated according to various embodiments. The nacelle 100 may comprise an inlet 110, a fan cowl 120, and a thrust reverser 130. The nacelle 100 may be coupled, directly or indirectly, to a pylon 140, which may mount the nacelle 100 to an aircraft wing or aircraft body. The thrust reverser 130 may comprise a translating sleeve which translates relative to one or more track beams in order to deploy the thrust reverser 130.

A fan draws and directs a flow of air into and through the propulsion system. After the fan, the air is divided into two principal flow paths, one flow path through the engine core, and another flow path through a bypass air duct. The bypass air flow path includes air from the fan that is directed around the engine core in a duct or ducts defined by the nacelle.

Figure 2A:
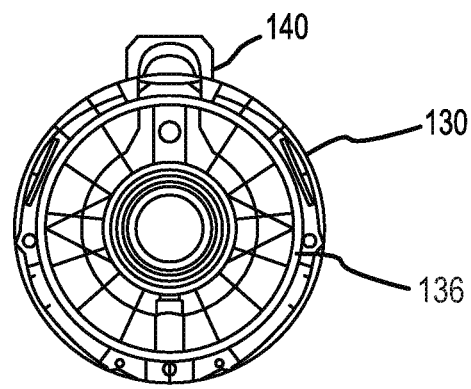
FIGS. 2A-2B are rear views of a propulsion system and depict the open (for engine access and maintenance) and closed positions of the thrust reverser.
Figure 2B:
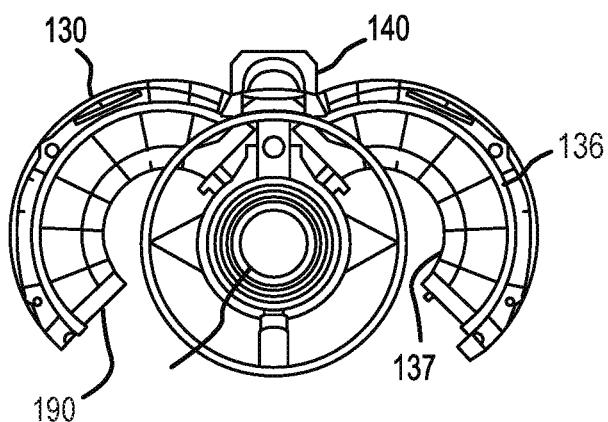

The thrust reverser 130 may comprise two halves generally configured to surround the engine core. The thrust reverser 130 may be hinged to the pylon 140 via one or more hinges. This typical hinged attachment and relative hinging motion is depicted in FIGS. 2A-2B. The thrust reverser 130 comprises an inner fixed structure 137 and an outer sleeve 136. The inner fixed structure 137 generally surrounds the engine core and helps define the core compartment. The two halves of the thrust reverser 130 may be separated at the 6 o'clock position by lower bifurcation panels 190. An interior surface of the outer sleeve 136, along with the inner fixed structure (IFS) 137, partially defines the bypass air duct or cold flow path of the propulsion system of the aircraft. The IFS 136 and the outer sleeve 136 are typically coupled together and attached to the pylon 140 via the same hinges in a translating sleeve, cascade-style thrust reverser. As used herein, the IFS is generally referred to in the singular; however it should be appreciated that an IFS may actually constitute two or more separate IFS halves that join together to form the enclosure around the engine core and may move or hinge open in order to permit engine access. Furthermore, while IFS is a label typically used to refer to the style of aerodynamic fairing depicted in FIGS. 1 and 2 that forms part of the cascade-style thrust reverser, IFS as used herein may mean any type of aerodynamic fairing which generally surrounds the engine core and helps define the core compartment. The IFS is "fixed" in the sense that it typically does not move out of place when the thrust reverser deploys, but it may move (hinge, slide, etc.) in order to provide engine access.

Figure 3:
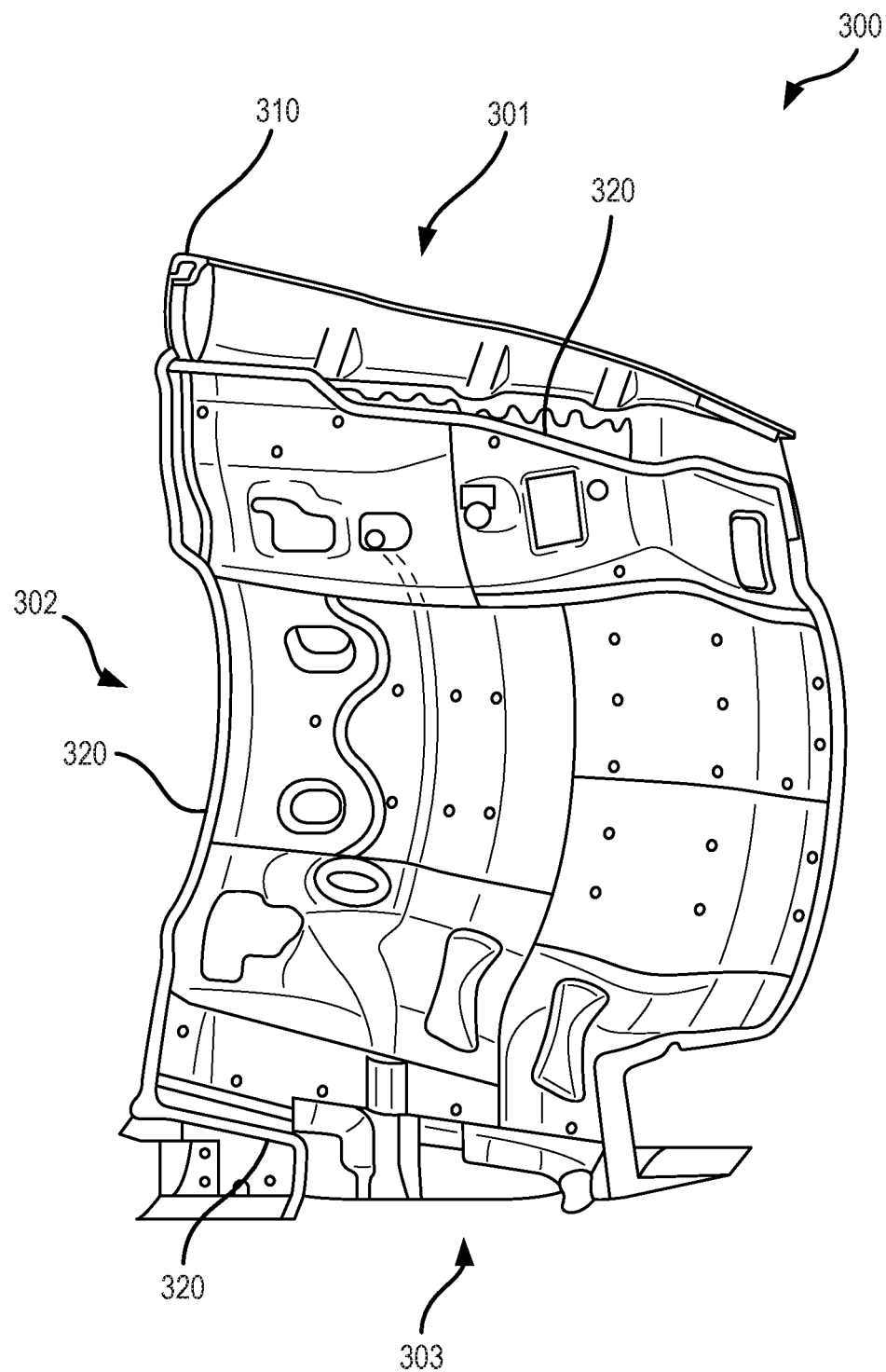
FIG. 3 illustrates a perspective view of an interior of an inner fixed structure half in accordance with various embodiments.

Referring to FIG. 3, a perspective view of an interior of an IFS half 300 is illustrated according to various embodiments. The IFS may hinge open relative to a pylon at a hinge 310. The IFS half 300 may comprise a bulb seal 320. The bulb seal 320 may comprise an elastomeric material. The bulb seal 320 may be configured to seal against a pylon and/or other nacelle components. The bulb seal 320 may be an elongated seal which extends along at least part of an upper portion 301, a forward portion 302, and a lower portion 303 of the IFS half 300. The bulb seal 320 may comprise one or more segments which together from the length of the bulb seal 320.

Figure 4:
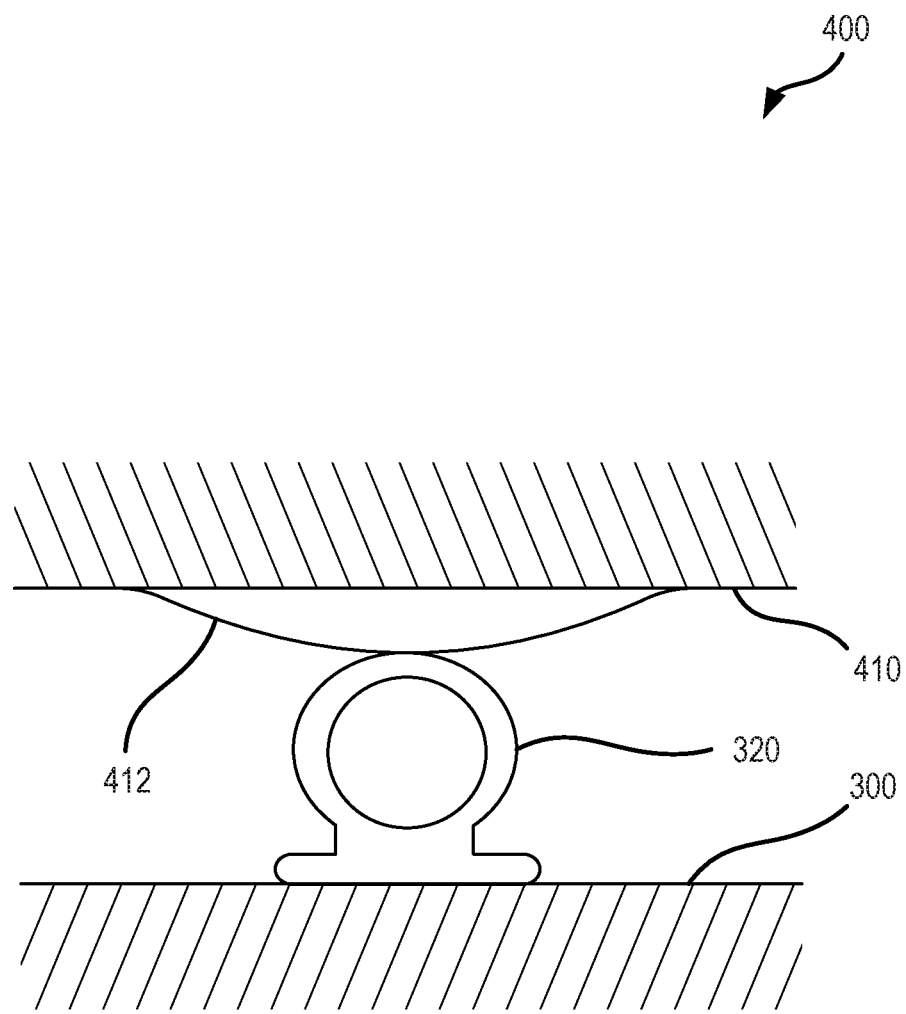
FIG. 4 illustrates a cross-section view of a bulb seal in accordance with various embodiments.

Referring to FIG. 4, a cross-section of a sealing system 400 including the bulb seal 320 is illustrated according to various embodiments. The sealing system 400 may create a seal between two components. The bulb seal 320 is coupled to a first component, which may be the IFS half 300, and the bulb seal 320 is configured to seal against a second component, which may be a nacelle component 410. As used herein, a "nacelle component" may include any component of a nacelle, pylon, engine, or engine case which seals against any other component. A spring 412 is coupled to the nacelle component 410. In various embodiments, the spring 412 may comprise a leaf spring. The spring 412 may comprise a metallic material, such as titanium, aluminum, or steel. The bulb seal 320 and the spring 412 may contact to form the seal between the IFS half 300 and the nacelle component 410.

Figure 5:
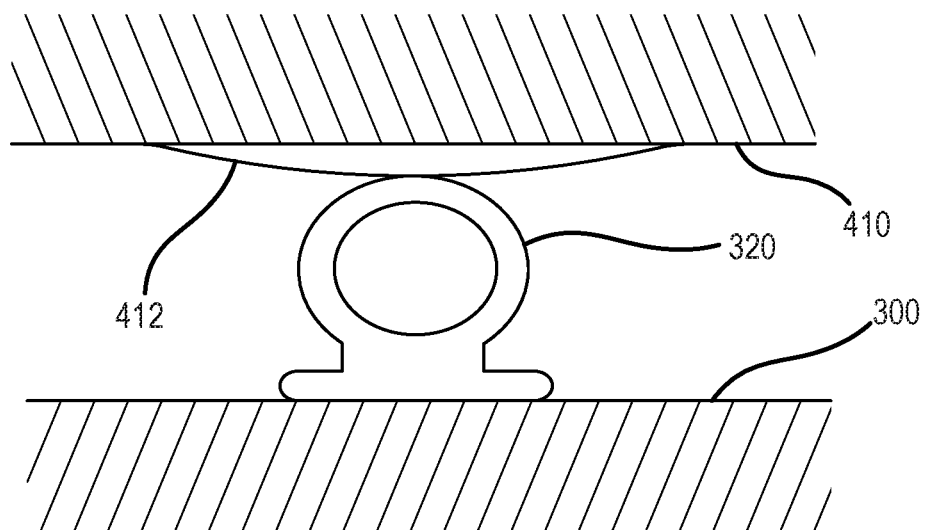
FIG. 5 illustrates a cross-section view of a new bulb seal compressed in accordance with various embodiments.

Referring to FIG. 5, a cross-section of the bulb seal 320 when relatively new is illustrated according to various embodiments. In response to the IFS 300 being pressed against the nacelle component 410 (e.g. when a thrust reverser door is closed), the bulb seal 320 and/or the spring 412 compress. When the bulb seal 320 is relatively new, the elastomeric material of the bulb seal 320 may be stiff, causing the spring 412 to compress. As used herein the terms "stiff" and "flexible" are used only in a relative sense, such that a "flexible" component has a greater elasticity than a "stiff" component.

Figure 6:
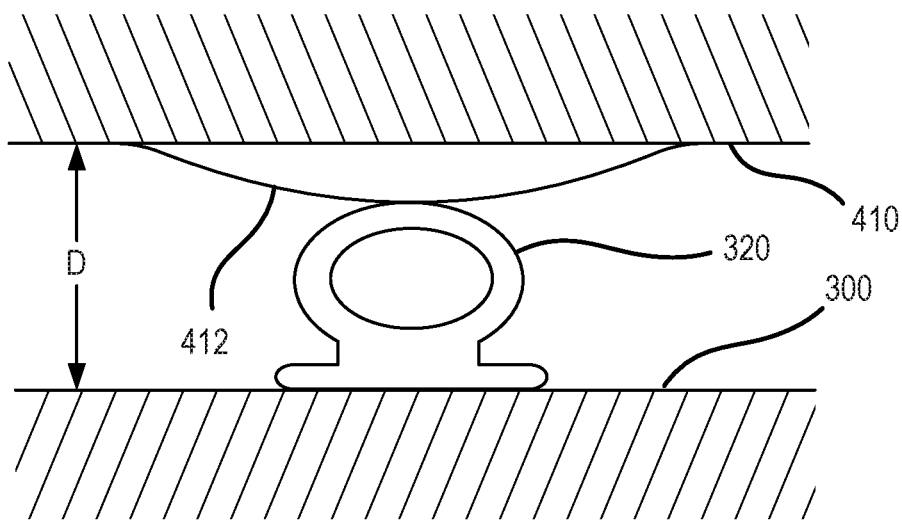
FIG. 6 illustrates a section view of a softened bulb seal compressed in accordance with various embodiments.
Figure 7A:
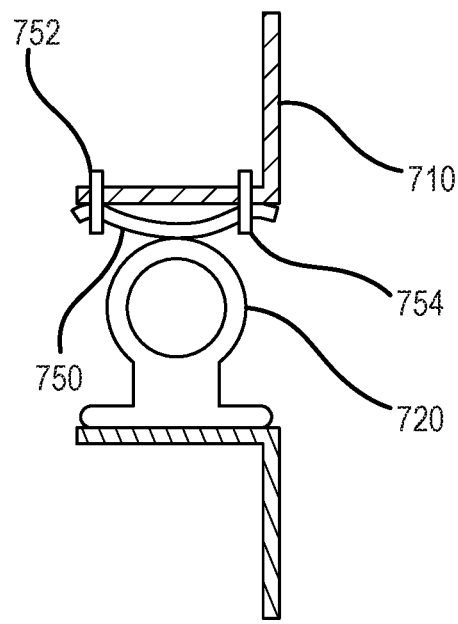
FIG. 7A illustrates a cross-section view of an uncompressed seal system with a spring being fixed at both ends in accordance with various embodiments.
Figure 7B:
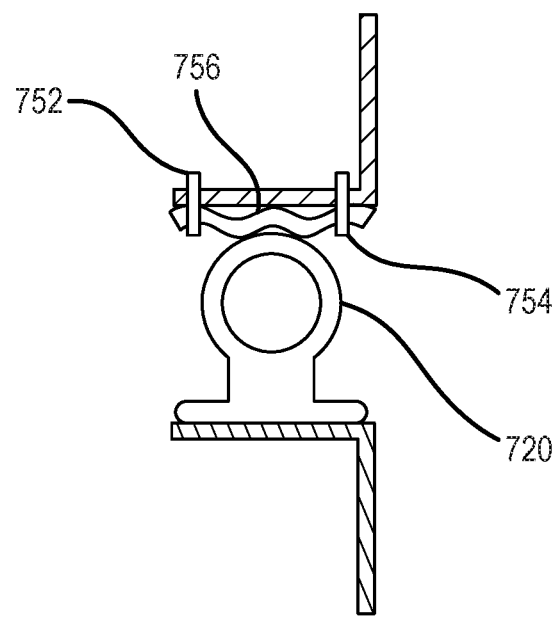
FIG. 7B illustrates a cross-section view of a compressed seal system with a spring being fixed at both ends in accordance with various embodiments.

Referring to FIG. 6, a cross-section of the bulb seal 320 when relatively softened is illustrated according to various embodiments. As the bulb seal 320 ages, the elastomeric material of the bulb seal 320 may soften and become more pliable. In response to the IFS 300 being pressed against the nacelle component 410, the bulb seal 320 may compress by a greater amount relative to the newer bulb seal illustrated in FIG. 5. Because the bulb seal 320 compresses by a greater amount, the spring 412 may compress by a lesser amount, even though the separation distance D between the IFS 300 and the nacelle component 410 may be equal in FIG. 5 and FIG. 6.

FIGS. 7-10 illustrate various spring attachment configurations. Referring to FIGS. 7A and 7B, a spring 750 may be attached to a nacelle component 710 by a first attachment 752 at a first end of the spring 750, and a second attachment 754 at a second end of the spring 750. The attachments 752, 754 may comprise a bolt, screw, rivet, bond, weld, or any other suitable attachment. As the spring 750 compresses due to pressure from the bulb seal 720, as shown in FIG. 7B, the spring 750 may remain fixed at the attachments 752, 754, and a center portion 756 of the spring 750 may invert.

Figure 8A:
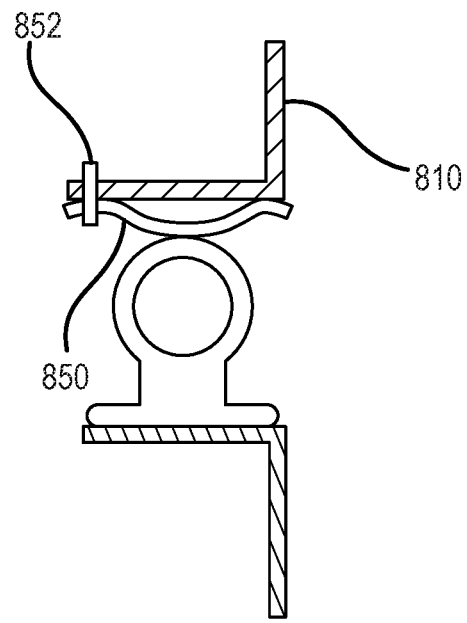
FIG. 8A illustrates a cross-section view of an uncompressed seal system with a spring being fixed at one end in accordance with various embodiments.
Figure 8B:
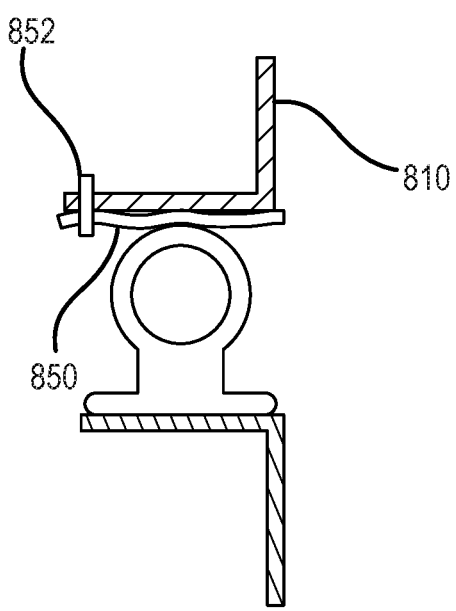
FIG. 8B illustrates a cross-section view of a compressed seal system with a spring being fixed at one end in accordance with various embodiments.

Referring to FIGS. 8A and 8B, a spring 850 may be attached to a nacelle component 810 by a first attachment 852 at a first end of the spring 850, and the second end of the spring 850 may be free to slide along the nacelle component 810. As the spring 850 compresses, as shown in FIG. 8B, the spring 850 may remain fixed at the first attachment 852, the spring 850 may flatten out, and the second end of the spring 850 may slide along the nacelle component 810 away from the first attachment 852.

Figure 9A:
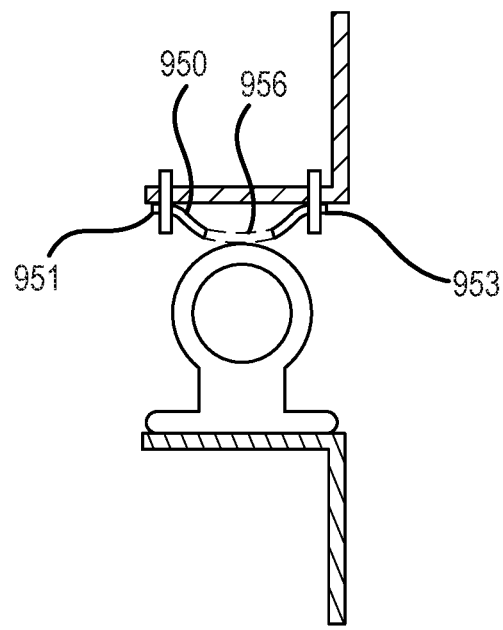
FIG. 9A illustrates a cross-section view of an uncompressed seal system with a spring having a flexible central portion in accordance with various embodiments.
Figure 9B:
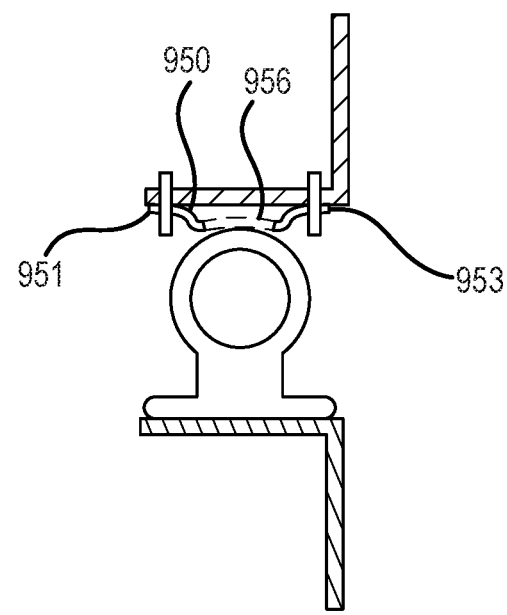
FIG. 9B illustrates a cross-section view of a compressed seal system with a spring being having a flexible central portion in accordance with various embodiments.

Referring to FIGS. 9A and 9B, a spring 950 may comprise a first stiff end 951, a second stiff end 953, and a flexible central portion 956 located between the first stiff end 951 and the second stiff end 953. In various embodiments, the first stiff end 951 and the second stiff end 953 may comprise a metallic material, and the flexible central portion 956 may comprise an elastomeric material. As the spring 950 compresses, as shown in FIG. 9B, the first stiff end 951 and the second stiff end 953 may remain fixed, and the flexible central portion 956 may flex and/or invert.

Figure 10A:
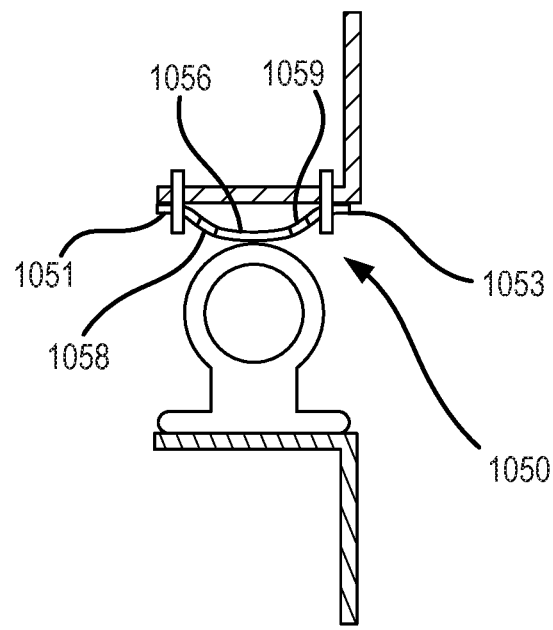
FIG. 10A illustrates a cross-section view of an uncompressed seal system with a spring having two flexible portions in accordance with various embodiments.
Figure 10B:
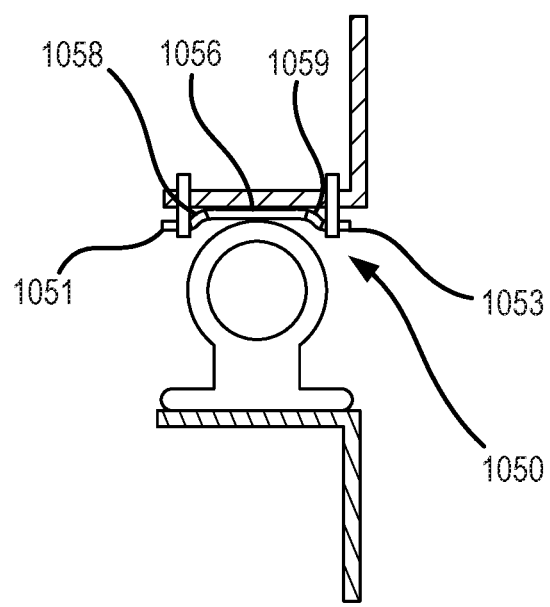
FIG. 10B illustrates a cross-section view of a compressed seal system with a spring having two flexible portions in accordance with various embodiments.

Referring to FIGS. 10A and 10B, a spring 1050 may comprise a first stiff end 1051, a second stiff end 1053, and a stiff central portion 1056 located between the first stiff end 1051 and the second stiff end 1053. A first flexible portion 1058 may be located between the first stiff end 1051 and the stiff central portion 1056, and a second flexible portion 1059 may be located between the stiff central portion 1056 and the second stiff end 1053. In various embodiments, the first flexible portion 1058 and the second flexible portion 1059 may comprise an elastomeric material or a spring, such as a helical spring. As the spring 1050 compresses, as shown in FIG. 10B, the first stiff end 1051 and the second stiff end 1053 may remain fixed, and the first flexible portion 1058 and the second flexible portion 1059 may allow the stiff central portion 1056 to move with limited deformation of the stiff central portion 1056.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

What is claimed is:

1. An aircraft engine nacelle comprising:
   an outer sleeve;
   an inner fixed structure surrounding a portion of an engine and helping to define a core compartment, the outer sleeve and the inner fixed structure defining between them a bypass air duct, the inner fixed structure being rotatable relative to a nacelle component;
   a bulb seal coupled to the inner fixed structure; and
   a spring coupled to the nacelle component;
   wherein the bulb seal and the spring are configured to form a seal between the inner fixed structure and the nacelle component, wherein the seal between the inner fixed structure and the nacelle component is formed in response to contacting the spring with a rounded portion of an outer surface of a bulb of the bulb seal,
   wherein the spring comprises a first stiff end, a second stiff end, a stiff central portion located between the first stiff end and the second stiff end, a first flexible portion located between the first stiff end and the stiff central portion, and a second flexible portion located between the stiff central portion and the second stiff end.

2. The aircraft engine nacelle of claim 1, wherein the bulb seal comprises an elastomeric material.

3. The aircraft engine nacelle of claim 2, wherein the spring comprises a metallic material.

4. The aircraft engine nacelle of claim 1, further comprising a first fastener coupling a first end of the spring to the nacelle component.

5. The aircraft engine nacelle of claim 4, further comprising a second fastener coupling a second end of the spring to the nacelle component.

6. The aircraft engine nacelle of claim 4, wherein a second end of the spring is configured to slide relative to the nacelle component.

7. The aircraft engine nacelle of claim 1, wherein an elasticity of the bulb seal is configured to increase over time.

8. The aircraft engine nacelle of claim 1, wherein the bulb seal and the spring are configured to maintain a constant distance between the inner fixed structure and the nacelle component.

9. A sealing system comprising:
a first component;
a second component;
a bulb seal coupled to the first component; and
a spring coupled to the second component;
wherein the bulb seal and the spring are configured to form a seal between the first component and the second component, wherein the seal between the first component and the second component is formed in response to contacting the spring with a rounded portion of an outer surface of a bulb of the bulb seal,
wherein the spring comprises a first stiff end, a second stiff end, a stiff central portion located between the first stiff end and the second stiff end, a first flexible portion located between the first stiff end and the stiff central portion, and a second flexible portion located between the stiff central portion and the second stiff end.

10. The sealing system of claim 9, wherein the bulb seal and the spring are configured to maintain a constant distance between the first component and the second component.

11. The sealing system of claim 9, wherein the first component comprises an inner fixed structure of an aircraft nacelle, and wherein the second component comprises a nacelle component.

12. The sealing system of claim 9, wherein the bulb seal comprises an elastomeric material.

13. The sealing system of claim 12, wherein the spring comprises a metallic material.

14. A nacelle comprising:
a first component;
a second component;
a bulb seal coupled to the first component; and
a spring coupled to the second component;
wherein the bulb seal and the spring are configured to form a seal between the first component and the second component, wherein the seal between the first component and the second component is formed in response to contacting the spring with a rounded portion of an outer surface of a bulb of the bulb seal,
wherein the spring comprises a first stiff end, a second stiff end, a stiff central portion located between the first stiff end and the second stiff end, a first flexible portion located between the first stiff end and the stiff central portion, and a second flexible portion located between the stiff central portion and the second stiff end.

15. The sealing system of claim 14, wherein the bulb seal and the spring are configured to maintain a constant distance between the first component and the second component.

16. The sealing system of claim 14, wherein the first component comprises an inner fixed structure, and wherein the second component comprises a pylon.

17. The sealing system of claim 14, wherein the bulb seal comprises an elastomeric material.

18. The sealing system of claim 17, wherein the spring comprises a metallic material.

* * * * *